United States Patent [19]

Seitz

[11] 4,038,670
[45] July 26, 1977

[54] PANORAMIC PICKUP CAMERA

[75] Inventor: Hermann Seitz, Niederwangen, Switzerland

[73] Assignee: Infra-Vision Ltd. Zug, Schaffhausen, Switzerland

[21] Appl. No.: 554,448

[22] Filed: Mar. 3, 1975

[30] Foreign Application Priority Data

Mar. 11, 1974  Germany .............................. 2411537

[51] Int. Cl.$^2$ ...................... G03B 37/00; G03B 37/02
[52] U.S. Cl. .......................................... 354/96; 354/95
[58] Field of Search ................................... 354/94–96, 354/98, 99

[56] References Cited

U.S. PATENT DOCUMENTS

| | | | |
|---|---|---|---|
| 1,266,616 | 5/1918 | Odell | 354/99 |
| 2,928,313 | 3/1960 | Hattori | 354/96 |
| 2,972,281 | 2/1961 | Dresser | 354/96 |
| 3,141,397 | 7/1964 | McNeil | 352/69 |
| 3,142,237 | 7/1964 | Waroux | 354/99 |
| 3,230,850 | 1/1966 | Campbell | 354/99 |
| 3,374,721 | 3/1968 | Praag | 354/99 |
| 3,532,039 | 10/1970 | Rising | 354/96 |

Primary Examiner—Edna M. O'Connor
Attorney, Agent, or Firm—O'Brien & Marks

[57] ABSTRACT

A panoramic camera for producing pictures with randomly large image or viewing angles which may exceed 360° and in which at the moment of exposure the objective or film is stationary. There is provided a camera housing containing the objective and rotatable relative to a support or holder. There is further provided a film container and a film guide having a cylindrical guide portion, the radius of curvature of which is equal to the focal length of the objective. According to the invention the camera housing besides containing the objective also includes the film container, the film guide also including a ring in the housing opposite from the support which is freely rotatable or stationary respective to the housing. The support is cylindrical and a cylindrical circumferential surface is provided at the edge of cylindrical support. The film is fixedly held with its one edge at the cylindrical circumferential surface and with its other edge is held under contact at a second cylindrical circumferential surface formed on the ring.

8 Claims, 4 Drawing Figures

PANORAMIC PICKUP CAMERA

BACKGROUND OF THE INVENTION

The present invention relates to a new and improved construction of panoramic pickup or recording camera —hereinafter conveniently referred to simply as a panoramic pickup camera— for producing pictures with randomly large image or viewing angles which may exceed 360° and wherein at the moment of light exposure the objective or film is held stationary, there further being provided a camera structure containing the objective and rotatable relative to a support, a film container and a film guide having a cylindrical domed or arched portion, the radius of which is equal to the focal length of the objective.

According to a prior art panoramic pickup camera of this type, as disclosed in Swiss Pat. No. 373,634, the film is supported over its entire width at the hollow cylindrically arched portion. This portion only extends over an angular range up to 180°. A larger angular range is not possible because then light can no longer reach the objective. The film strip section which is to be exposed must be applied to the cylindrically arched portion prior to the swiveling and simultaneous exposure and must again be removed for taking a new picture and replaced by a new film strip section from the film container which is stationary in relation to the rotatable objective. This makes it complicated to work with the aforementioned prior art panoramic pickup camera.

There is also known to the art from German patent publication No. 1,208,174 a pickup or recording camera in which a camera structure together with the objective and a film container can be conjointly rotated relative to a static support or holder. In this case the film is delivered by a separate drive which is derived from the drive for the camera structure and is designed to rotate contra thereto, and specifically by means of a gearing drive. In order to achieve a good quality of the picture without disturbing over-exposed or under-exposed strips or blurred locations there is necessary an exact synchronization of the pivot drive and the contrarotating infeed drive. However, such synchronization can only be realized with an extremely precise gearing drive which is free of play and as a practical matter can hardly be realized. In another panoramic pickup camera working according to the same principle, as taught for instance in German patent publication No. 64,041, the coupling between the pivot drive and the film infeed drive is established by means of a friction drive instead of via a gearing drive, and which with respect to the accuracy of the synchronization can be even more problematic than the gearing transmission.

SUMMARY OF THE INVENTION

It is a primary object of the present invention to provide an improved panoramic pickup camera which is not associated with the aforementioned drawbacks and limitations of the prior art constructions.

Another and more specific object of the invention aims at constructing a panoramic pickup camera of the previously mentioned type in such a way that through the use thereof by improving the film infeed it is possible to make pictures of 360° and more of high quality, i.e., without under-exposed or over-exposed film strips or with blurred locations.

Now in order to implement these and still further objects of the invention, which will become more readily apparent as the description proceeds, the invention contemplates that the camera structure apart from containing the objective also contains the film container, that the film guide possesses a ring on the side of the housing of the camera which is opposite the support and which ring in turn is freely rotatable or stationary, respectively. On the cylindrical support there is provided a cylindrical circumferential or peripheral surface and the film is held under contact at its on edge on the cylindrical circumferential surface and at its other edge on a a further circumferential surface on the ring.

With the panoramic pickup camera of this development the film can be continuously guided about the focal plane through 360° and more, in particular can be wound-up and wound-off, and wherein the film section to be exposed is fixedly held at the circumferential surfaces at the proper spacing with respect to the objective. By reversing the movement it is possible to carry out double- and multiple exposures. By virtue of fixedly retaining the film at the circumferential surfaces there is insured a continual rolling-off of the film opposite to the swivel or pivotal movement with exact synchronization. Further due to the contact against the support or holder upon rotating the objective and therefore the film container or —with fixedly retained objective and film container during rotating of the support— the film can be continuously wound-off with the same large, however opposite speed with respect to the speed of the rotational movement and, after pressing-on or contacting and exposure of such film strip section at the stationary peripheral surface, such can again be wound-up.

In this regard a particularly simple construction is achieved through a feed device for the film including two rollers which are arranged in spaced relationship from one another but are neighboring and are axially parallel to the circumferential surfaces. The film which is delivered out of the film container upon pivoting the objective travels over such rollers, while interposing endless elastic bands surround or enclose the two rollers.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
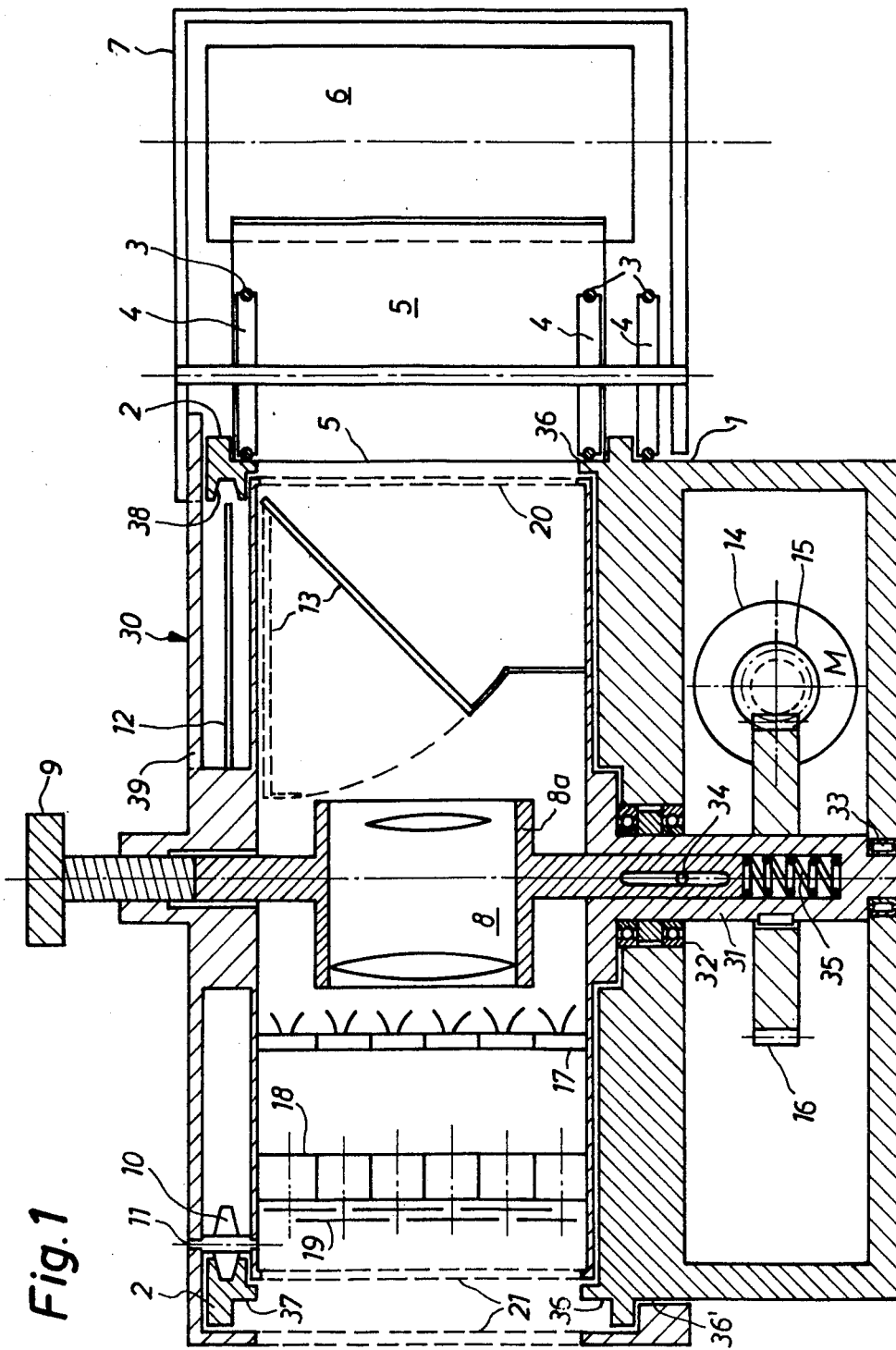
FIG. 1 is a side sectional view through a panoramic pick-up camera constructed according to the teachings of the invention.
Figure 2:
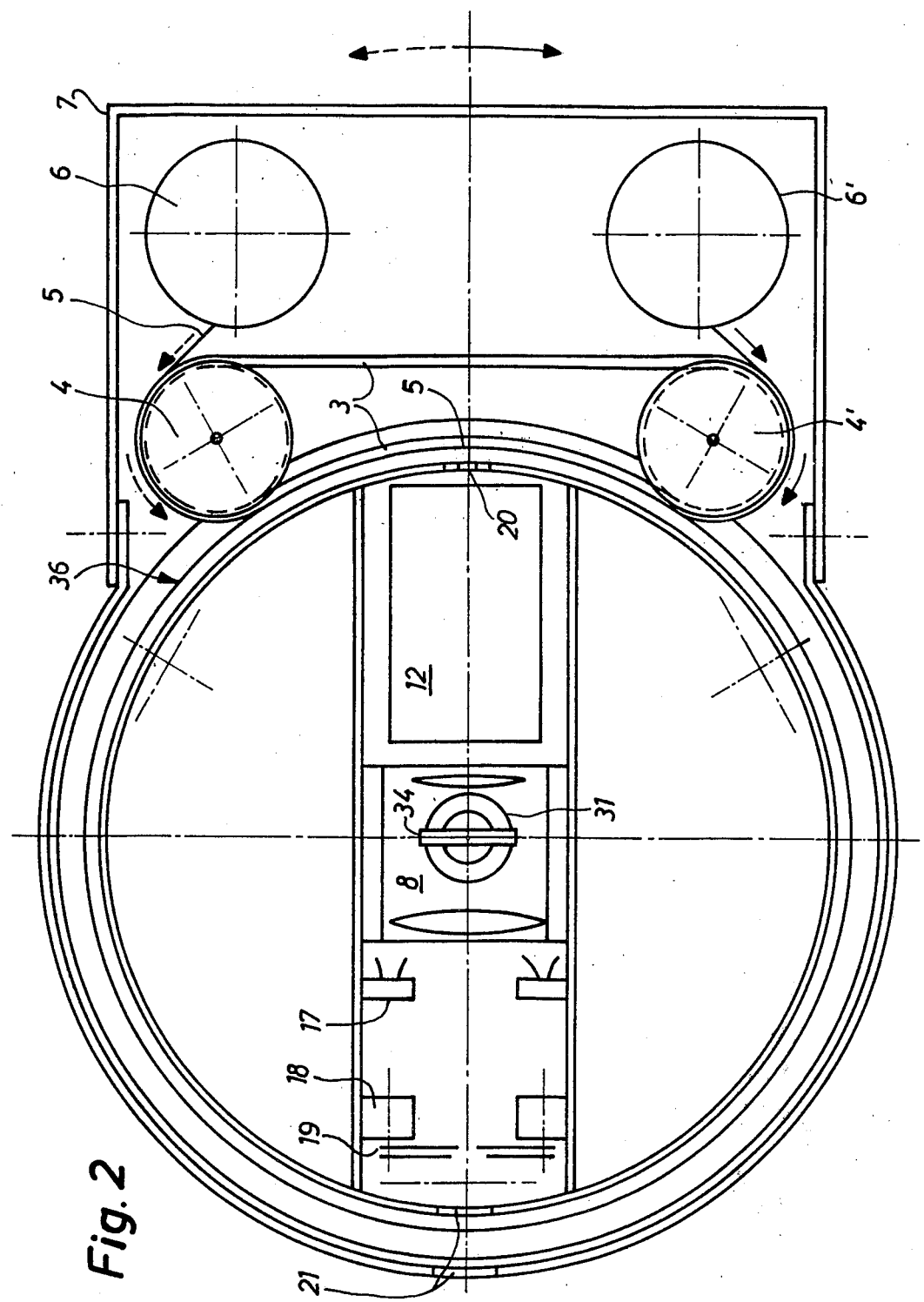
FIG. 2 is a sectional view from above of the camera depicted in FIG. 1.
Figure 3:
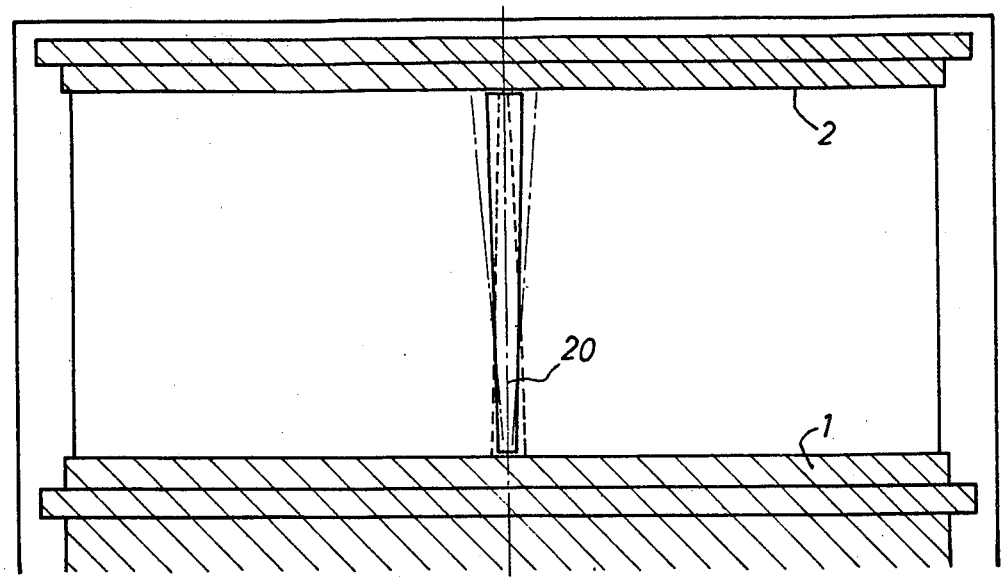
FIG. 3 is a sectional view from the rear i.e. from the film side of the camera of FIGS. 1 and 2.
Figure 4:
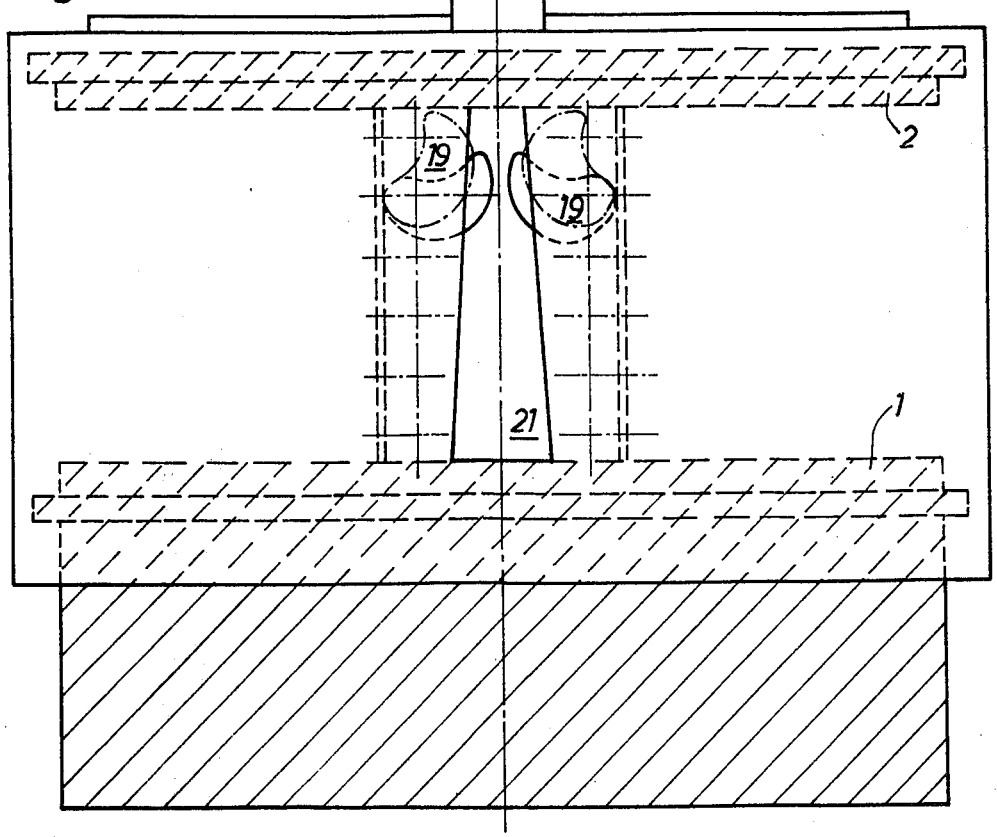
FIG. 4 is a sectional view from the front i.e. from the light incident side at the camera of FIGS. 1 to 3.

The embodiment of a panoramic pickup camera according to the present invention as illustrated in FIGS. 1-4 includes a stationary component 1 defining a support or holder which is attached to a tripod or the like which has not been shown here. On the stationary component 1, there is mounted a pivotal or swivel component 30 which is rotatable about a journal or pivot pin 31 which is fixed to the pivotal component 30 and is held in place by the bearings 31 and 33. The axis of rotation of the pivoted component is indicated by the broken vertical line in FIG. 1 extending through the journal or pivot pin 31. Along the axis of rotation within the pivotal component 30 an objective 8 is housed in a substantially cylindrical housing 8a. The housing 8a and the enclosed objective 8 can be vertically adjusted relative to the pivotal component 30 through the use of an adjusting or positioning screw 9 and a pin-slot guide 34 to keep the objective 8 rotationally fixed relative to the pivotal component 30. A helical spring 35 which is enclosed in the hollow journal or pivot pin 31 between the pivotal component 30 and the objective 8 insures that the mounting of the objective 8 in the pivotal component 30 is free of any play.

The stationary component 1 i.e. the support or holder is provided along the periphery of its upper edge with a substantially circular cylindrical circumferential surface 36. Above the circumferential surface 36 and at a spacing therefrom corresponding approximately to the width of the film there is provided a ring or ring member 2. The ring 2 possesses a circumferential or peripheral surface 37 defined thereon which is coplanar with respect to the circumferential surface 36 on the stationary component 1. Both the circumferential surfaces 36 and 37 surround the object 8 and have as there radius the focal length of the objective 8. The ring 2 also has formed thereon an inner guide groove 38 which is engaged by guide rollers 10 which one mounted on pins 11 attached to the pivotal component 30. The ring 2 is thus freely rotatable relative to the pivotal component 30. Along the side of the pivotal component 30 behind the objective 8 and externally of both the circumferential surfaces 36, and 37 there is attached to the pivotal component 30 a film container 7 in which are housed two cartridges 6 and 6' for paying-off and winding-up film material.

Each of the cartridges 6 and 6' has operatively associated therewith a respective roller 4 or 4', and the rollers 4 and 4' are disposed adjacent the peripheral or circumferential surfaces 36 and 37. The cartridges 6 and 6' and the rollers 4 and 4' are arranged axially parallel with respect to the axis of rotation of the pivotal component 30. A set of bands 3 of an elastic material are entrained over and extend between the rollers 4 and 4'. One of the bands 3 is arranged at such a position that it is clamped along the interior portion of its run between the rollers 4 and 4' and the circumferential surface 37. A second one of the bands 3 is clamped along its interior run confronting the objective 8 between the rollers 4 and 4' and the peripheral surface 36 on the stationary component 1. A third one of the bands 3 is provided pressed along its interior run in the same manner at a second circular cylindrical circumferential surface 36' additionally provided on the stationary component 1 in order to insure a uniform rotation of the rollers 4 which rotation is porportional to the pivoting or swivel movement of the pivotal component 30. Between the bands 3 and the circumferential surfaces 36 and 37 a roll of film 5 is delivered from the cartridge 6 and over the rollers 4, which film is pressed against the peripheral or circumferential surfaces 36 and 37 by the action of the bands 3 stretched between both of the rollers 4 and 4'. The section of the film 5 which is between the rollers 4 and 4' is thus located at a spacing of one focal length from the objective 8. By means of the roller 4' the film is wound-up into the cartridge 6'. The winding-off and winding-up of the film material 5 is carried out by swiveling or rotating the pivotal component 30 and therewith the film container 7 along with the cartridges 6 and 6' and rollers 4 and 4', whereby at all times the film section stretched between the rollers 4 and 4' remains stationary due to its contact with the stationary circumferential surfaces 36 and 37.

The pivotal movement is generated by an electric motor 14 equipped with worm gearing 15 and 16 to transmit the rotation to the pivot pin 31 of the pivotal component 30. The motor 14 can be controlled by photoelectric cells 17 arranged forwardly of the objective 8. These photoelectric cells 17 which, measure the incident light, are arranged in two vertical columns which correspond to and control twp sets of individual measuring devices 18 which act upon pivotal diaphragms or light stops 19 which define therebetween a conically tapering slot 21. In this way there can be realized a compensating correction of the incident light which oftentimes arrives in elevation with different intensity. Collectively the photoselectric-cells 17 control the rotational speed of the motor 14.

The light arrives in the camera through the conical slot 21 (FIGS. 1, 2 and 4) in the pivotal component 1 and after passing the adjustable diaphragms 19 and the photocells 17 reaches the objective 8. From there the light falls upon a mirror 13 which deflects the incident light toward a ground-glass plate 12 housed at the upper part of the pivotal component 1 and the image formed thereon is visible to the photographer through a glass disk or plate 39. As shown by the dashed line in FIG. 1, during the film exposure the mirror 13 is upwardly rocked out of the path of the light ray which proceed through a conical slot 20, which is adjustable, and through which the light proceeds to the section of the film 5 which is to be exposed, that section located between the rollers 4 and 4'. The mirror 13 serves a dual role as the closure for the camera and in its lowered position, as a viewer or view finder for the photographer.

The bands 3, and in particular the band located opposite the circumferential surface 36, can be provided with teeth to cooperate with teeth provided on the circumferential surface 36 to piercingly extend through perforations of the films. In this way there is achieved a form-locking or positive retention of the film with respect to the rotational movement of the pivotal component 30.

The feed or advance of the film 5 is caused by the movement of the rollers 4 which by means of the lowermost band 3 frictionally contact the outer circumferential surface 36' of the stationary component 1 and which are thus rotated during the pivotal movement of the pivotal component 30. Preferably all of the bands 3 are identical in their dimensions and all of the circumferential surfaces 36, 36' and 37, which are in engagement with the bands, have the same external diameter, so that due to the frictional grip pressing or contact of the film onto the circumferential surfaces 36, 37 together with the frictional engagement of the lowermost band 3 with the circumferential surface 36' there is insured for a continuous, slip-free and fixed holding of the film along the circumferential surfaces at all times.

It has been found that when the component 1 is stationary then the ring 2 also is stationary even through it is unattached to the stationary component 1. Hence, the rollers 4 as they roll along the circumferential surfaces bring about both a continuous winding-off of the 5 of the cartridge 6 and contacting of the wound-off film against the circumferential surfaces. It is therefore possible to continuously pivot the pivotal component 30 and the same time expose the film.

The cartridges 6 and 6' are provided with springs or other means which permit of a winding-up of the film.

The bands 3 can be specially profiled belts, such as V-belts. The lowermost belt could also be a toothed belt which is in engagement with a toothed rim on the component 1.

Instead of constructing the objective together with the film container to be pivotable such components could also be provided to be stationary, in which case then the component 1 would be constructed to be pivotable about its axis. In the lastmentioned situation the ring 2 would rotate synchronously with the component 1 without it having to be directly connected therewith.

While there is shown and described present preferred embodiments of the invention, it is to be distinctly understood that the invention is not limited thereto, but may be otherwise variously embodied and practiced within the scope of the following claims. Accordingly,

What is claimed is:

1. In a panoramic pickup camera for producing pictures with randomly large viewing angles which may exceed 360°, wherein at the moment of light exposure the film is stationary, having a support, a camera structure containing the objective and rotatable relative to the support, and a film container and a film guide having a substantially cylindrical arched portion, the radius of which is equal to the focal length of the objective, the improvement comprising: the camera structure containing spaced from the objective the film container, said camera structure incorporating a housing enclosing the objective, the film guide including a ring positioned on the side of the housing which is situated opposite the support, said ring being freely rotatable respective to the camera structure, said support possessing a substantially cylindrical configuration, a first substantially cylindrical circumferential surface provided on said cylindrical support, said ring possessing a second substantially cylindrical circumferential surface, the film being held under contact at its one edge against the first cylindrical circumferential surface of the support and at its other edge against the second cylindrical circumferential surface of the ring.

2. The camera as defined in claim 1, further including a feed mechanism for the film by means of which the film is drawn from the film container and is continuously contacted against said cylindrical circumferential surfaces.

3. A panoramic camera for producing pictures having large viewing angles comprising
   a fixed stationary component,
   a pivotal component mounted for rotational movement relative to the stationary component,
   an objective in the pivotal component located along the axis of rotation thereof,
   a ring rotationally mounted in the pivotal component,
   first and second circumferential surfaces, the first circumferential surface formed on the stationary component, the second circumferential surface formed on the ring, each of the circumferential surfaces being circular with the radius of the circle equalling the focal length of the objective,
   a film container carrier by the pivotal component,
   first and second spaced apart rollers in the film container with their axes positioned parallel to the axis of rotation of the pivotal component and located adjacent the circumferential surfaces, and
   at least two endless elastic bands extending over both of the first and second rollers adapted to hold film against the circumferential surfaces.

4. A panoramic camera as claimed in claim 3 wherein the rollers are driven by contact against a third circumferential surface which is formed on the stationary component.

5. A panoramic camera as claimed in claim 3 wherein an electric motor is provided to rotate the pivotal component and wherein there are photoelectric cells measuring the light incident to the camera to control the speed of the electric motor.

6. A panoramic camera as claimed in claim 3 wherein there is an aperture at one end or the pivotal component thereof to admit light, the aperture having an adjustable tapered conical configuration.

7. A panoramic camera as claimed in claim 3 wherein there is a hinged mirror provided between the objective and the film container which closes the top of the camera in one position and serves to direct light to a ground glass plate to form a view finder in its other position.

8. A panoramic camera as claimed in claim 3 wherein the objective is enclosed in a housing which is vertically adjustable within the pivotal component.

* * * * *